D. FLANAGAN.
STARTING GEARING FOR INTERNAL COMBUSTION ENGINES.
APPLICATION FILED NOV. 1, 1913.
1,145,475. Patented July 6, 1915.
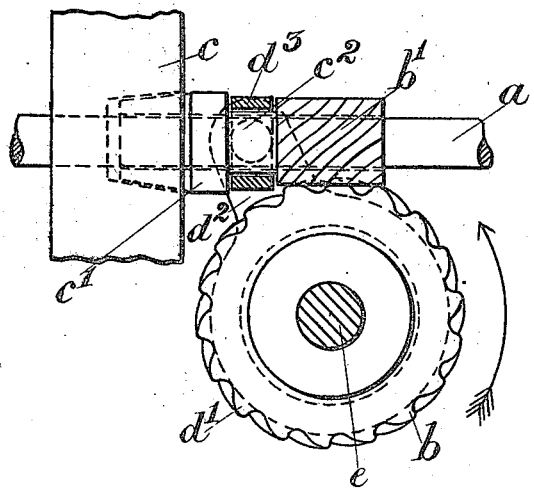
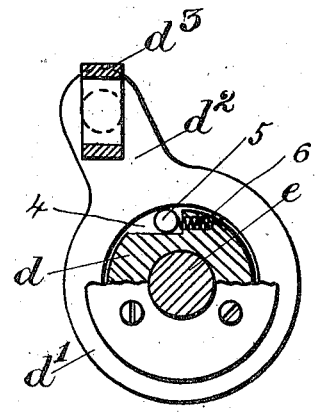
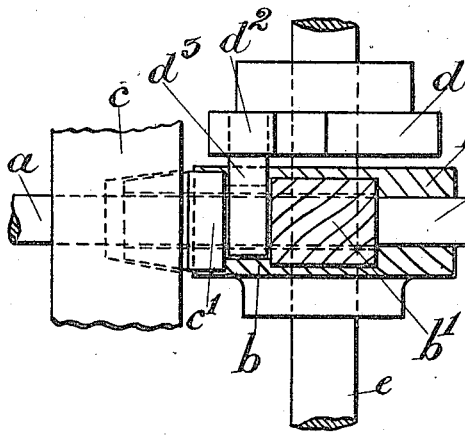
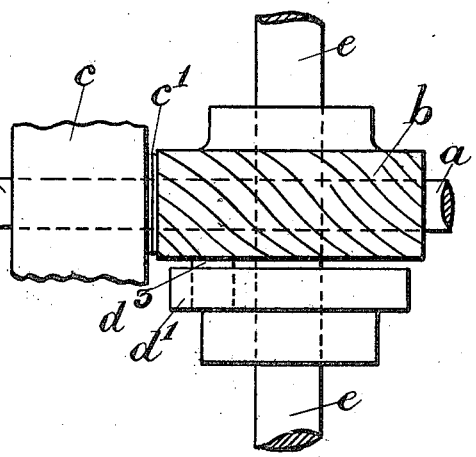
Witnesses:
Inventor:
Denis Flanagan,
by Hubert W. Jenner.
Attorney.

UNITED STATES PATENT OFFICE.

DENIS FLANAGAN, OF ALTHAM, NEAR ACCRINGTON, ENGLAND, ASSIGNOR OF ONE-HALF TO CHARLES TURNER, OF IRLAM, ENGLAND.

STARTING-GEARING FOR INTERNAL-COMBUSTION ENGINES.

1,145,475.

Specification of Letters Patent.

Patented July 6, 1915.

Application filed November 1, 1913. Serial No. 798,648.

*To all whom it may concern:*

Be it known that I, DENIS FLANAGAN, a subject of the King of Great Britain, residing at Altham, near Accrington, in the county of Lancaster, England, have invented certain new and useful Improvements in Starting-Gearing for Internal-Combustion Engines, of which the following is a specification.

This invention relates to starting gearing for internal combustion engines and is particularly applicable for use in connection with motor vehicles, motor boats, aeroplanes and the like, but it may be applied to internal combustion engines of all kinds, the chief object being to produce a gearing which will enable the engine to be started without the possibility of any shock or jar being transmitted to the operator whether the engine starts correctly or backfires, and without any material shock being inflicted upon any part of the mechanism of which the starting gearing is composed.

In helical gearing "the driver" generates two forces which acting on "the follower" impart to the latter (a) rotary motion and (b) an inclination to move in an endwise direction, generally spoken of as an end thrust. In this invention these forces are utilized to engage, rotate and disengage the engine shaft from the starting mechanism in the manner fully described below.

By way of example, I illustrate an embodiment of my starting gear in the accompanying sheet of drawings, in which:—

Figure 1 is a side elevation and Fig. 2 a plan of a starting gearing applied to the engine shaft of an internal combustion engine. Fig. 3 is an inverted plan of the same. Fig. 4 is a sectional elevation of the clutch on the transverse shaft.

In these views, $a$ designates the engine shaft; $b$ $b^1$ two helical gear wheels; $c$ $c^1$ two friction clutch members on the engine shaft, and $d$ $d^1$ ratchet roller clutch members that operate in conjunction therewith.

Rigidly fixed on the shaft $e$ is the helical or screw gear $b$, which gears with a similar and in this instance smaller wheel $b^1$ mounted loosely on the engine shaft $a$. Fixed to or forming part of the gear $b^1$ is the conical friction clutch member $c^1$ that is adapted to be moved into and out of gear with the hollow cone clutch member $c$. The latter is rigidly fixed upon the engine shaft and may either form part of the fly wheel or be a separate part.

When the helical gears $b$ $b^1$ are rotated by turning the shaft $e$ in the direction indicated by the arrow in Fig. 1, the end thrust set up thereby at once causes the gear $b^1$ to force the sliding clutch member $c^1$ on the engine shaft into engagement with the clutch member $c$ which is fixed thereon, with the result that rotary motion is imparted to the engine shaft. As soon as the engine starts it tends to accelerate the speed of rotation of the loose clutch member $c^1$ which in turn through gear $b^1$ tends to drive the wheel $b$ and consequently sets up an end thrust in the opposite direction thereby causing the gear $b^1$ to withdraw the clutch member $c^1$ from the member $c$ and thus disengage the starting gear from the engine shaft.

To disengage the sliding clutch member $c^1$ from the clutch member $c$ in the event of the engine backfiring the clutch members $d$ $d^1$ are employed. The clutch member $d$ is arranged in a circular chamber in the clutch member $d^1$, and it has a recess 4 on one side. A ball or roller 5 is arranged in the recess 4, and is held in place by a spring 6. The clutch member $d$ revolves by itself when revolved in the direction of the arrow in Fig. 1, and it actuates the clutch member $d^1$ automatically and like a ratchet wheel when revolved in the reverse direction. Of these members $d$ is rigidly fixed upon the shaft $e$ and $d^1$ is provided with an arm $d^2$ in which is pivoted a fork $d^3$ which engages with an annular groove $c^2$ formed in the sliding portion between the clutch member $c^1$ and the helical gear $b^1$.

When the direction of rotation of the engine is reversed owing to a back-fire it rotates the transverse shaft $e$ through the helical gear wheels $b^1$ $b$ (in the opposite direction to the arrow in Fig. 1) to a sufficient extent to cause the clutch member $d^1$ and the fork $d^3$ to withdraw the sliding clutch member $c^1$ from the rigid clutch member $c$, thereby disconnecting the engine shaft $a$ from the starting gear and preventing the transmission of any severe strain to the transverse shaft $e$.

As already indicated the arrangement shown on the drawings is merely intended as an example as the same may be varied or modified without departing from the essential feature of the invention, which consists in transmitting motion through screw or helical gearing to utilize the end thrust of such gearing to engage a clutch and rotate the engine shaft, and to disengage such clutch immediately the engine starts. For example any suitable type of clutch may be employed other than those illustrated, and instead of placing the helical wheel or worm $b^1$ and clutch members $c^1$ and $c$ on the engine shaft, $c$ might be placed on the engine shaft and $b^1$ and $c^1$ on a separate shaft in line with the engine shaft, or all might be placed on a separate shaft suitably arranged to rotate the engine shaft by gear or otherwise.

The transverse shaft $e$ may be rotated by hand power applied through a wheel or hand lever provided if necessary with a clutch, or by power derived from a small electric or other suitable auxiliary motor such power being applied either directly or through a clutch or gear.

What I claim as my invention and desire to secure by Letters Patent of the United States is:—

In a starting gearing, the combination with a revoluble shaft, and a clutch member secured thereon, of a helical toothed wheel slidable longitudinally on the said shaft and provided with a clutch member for engaging with the said clutch member, a non-slidable helical toothed wheel gearing into the aforesaid wheel and holding the said clutch members in engagement when revolved in one direction, and an automatic clutch having one member secured to the last said wheel and having its other member operatively connected with the longitudinally slidable wheel and its clutch member and operating to place the slidable clutch member out of engagement when the non-slidable wheel is revolved in the reverse direction.

In testimony whereof I affix my signature in presence of two witnesses.

DENIS FLANAGAN.

Witnesses:
ERNOLD SIMPSON MOSELEY,
MALCOLM SMETHURST.